United States Patent Office 3,362,376
Patented Jan. 9, 1968

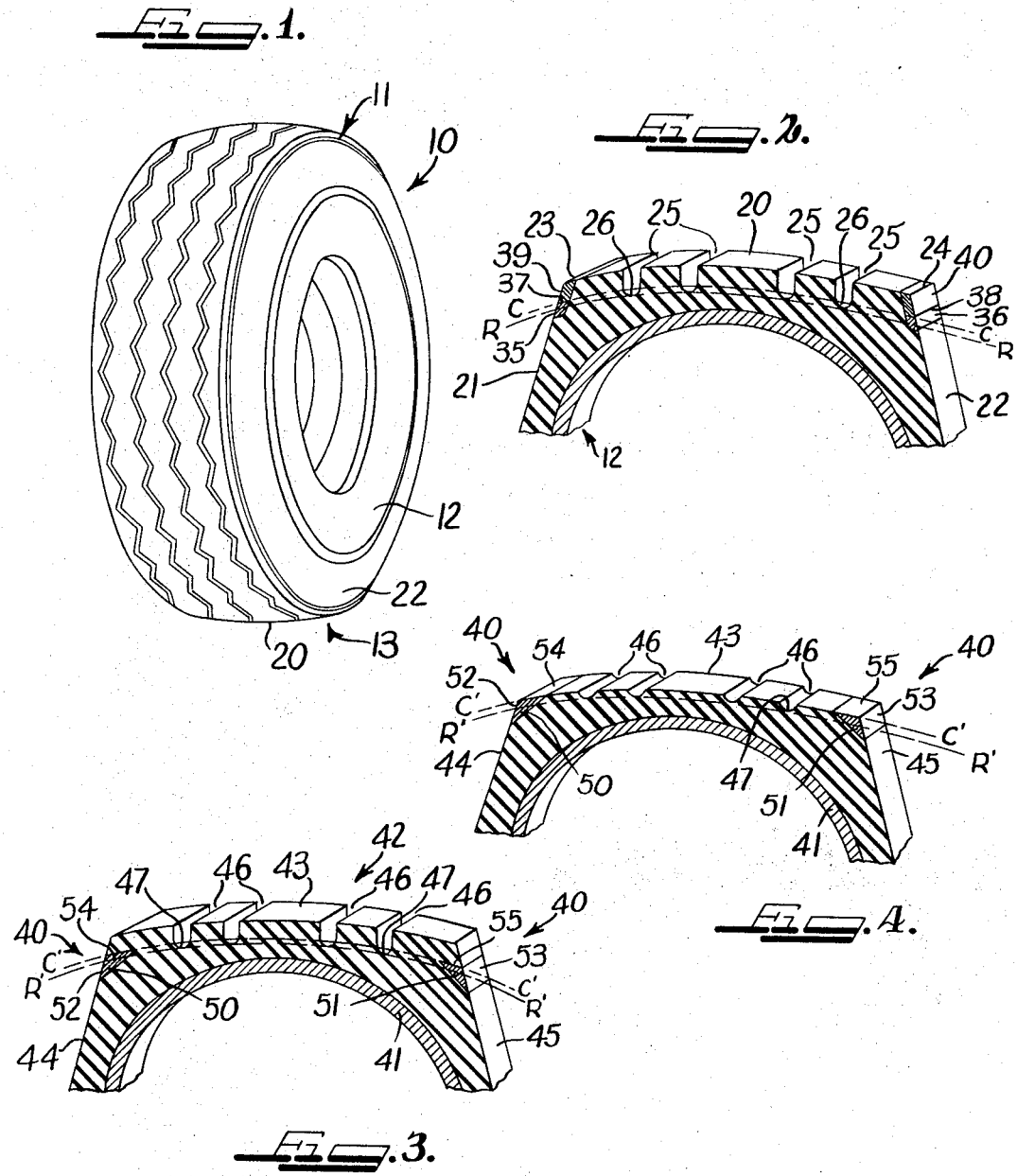

3,362,376
TIRE SAFETY INDICATOR MEANS
Frank F. Norton, 521 Talcott Road,
Park Ridge, Ill. 60068
Filed July 15, 1966, Ser. No. 565,618
5 Claims. (Cl. 116—114)

This invention relates generally to pneumatic tires, and more particularly to a safety means which provides a visible indication of the amount of usable tread on a tire, and a clearly discernible warning when the tire is unsafe for further use.

Pneumatic vehicle tires comprise generally a casing, or cascass, a pneumatic means to receive fluid pressure, and an outer peripheral sheath, or tread. The carcass and the pneumatic means cooperate to form a generally toroidal weight supporting structure which is adapted to cushion the vehicle from impacts caused by the tire striking imperfections in the road surface. The tread is adapted to provide frictional engagement between the tire and the road surface, and to protect the carcass from foreign articles on the road surface which would otherwise pierce the relatively thin wall of the carcass. The periphery, or ground engaging, portion of the tread is the only portion of the tire which engages a road surface, and substantially all of the tire wear occurs at this portion of the tread. Since the effectiveness of the tread as a protective sheath is dependent upon the amount of tread covering the carcass, this effectiveness is decreased as the tread is successively reduced by wear.

Heat is a further consideration in tire safety, for as successive circumferential portions of the tire engage the road surface, the carcass and tread thereof are subjected to flexure. The flexure produces heat energy in the tire, and as the rate of flexure is increased, the amount of heat so produced is also increased, and the strength of the tire is thereby correspondingly decreased. In order to cool vehicle tires, a plurality of circumferentially arranged grooves are formed in the ground engaging portion of the tread. These grooves provide passageways for air, and the rate of air flow therethrough, like the heat energy induced by flexure, is increased as the peripheral velocity of the tread is increased. Thus, the air passing through the grooves, counteracts the flexure induced heat to maintain the temperature of the tire within safe limits. However, the cooling ability of the grooves is also dependent upon the depth of the grooves, and is substantially eliminated when the depth of the grooves is reduced to approximately ten percent of their original depth. Thus, the effectiveness of the tread as a sheath, and of the grooves therein as cooling means, are concurrently decreased as the tread is worn by use. Further, the effect of these two factors is cumulative, so that the total effectiveness of the tread is decreased at a much greater rate as tread approaches a fully worn condition. For example, research conducted by the Auto Industries Highway Safety Committee has disclosed that 90 percent of tire failures occur during the last 10 percent of tread life.

Injuries to persons and property resulting from vehicular mishaps have reached alarming proportions. While the specific causes of these mishaps are varied, a substantial proportion of the mishaps are directly or indirectly attributable to defects present in the vehicles themselves. Defective tires have been a significant contributing cause of such mishaps. Yet, contrary to the engine, drive means, brakes and the structural members of a vehicle, which are concealed and are not understood by vehicle operators in general, the tires on most vehicles are sufficiently exposed to permit at least some defects therein to be observed and identified by the average vehicle operator. Thus, for example, a visual inspection of the tires of a vehicle will generally reveal such potential causes of tire failure as cuts and breaks in the outer side walls of the tires. However, the tread portions and inner side walls of the tires are partly obscured by the fenders and body of the vehicle and by engagement with the ground, so that defects in these portions of the tires are not readily visible. Further, it has been necessary to measure the depth of the tread at one of the grooves therein to determine the condition of the tire with respect to tread wear, and such a measurement is not meaningful unless and until interpreted by a tire expert.

It will thus be appreciated that the condition of a tire with respect to wear is a critical consideration in vehicular safety, and should be made the subject of frequent inspection by the operator, and by service personnel. In its broadest terms, my present invention provides a readily visible safety means for determining the condition of a vehicle tire with respect to tread wear. The safety means of my present invention is incorporated in the outer side wall of the tread portion of each of the tires of a vehicle where it is conspicuously visible. The condition of the tire with respect to tread wear is determined by visual examination of the safety means and includes both a measure of the amount of usable tread on the tire, and a conspicuous warning when the tire is worn to a condition at which further use is unsafe. Briefly summarized, my present invention comprises a visually distinguishable band which is positioned adjacent the outer peripheral portion of the side wall of the tread of a tire. The outside diameter of the band is arranged to conform to the diameter of the tire corresponding to the condition of wear of the tread thereof and at which further use of the tire is unsafe. Usable tread is indicated by the existance of a portion of the side wall of the tread outwardly of the band, and a fully worn condition is conspicuously indicated when the band itself defines the periphery of the side wall. Since the band is located on the outside wall of the tread it is in a position to be readily observed, and may be arranged to provide a desired degree of eminence.

It is an object of this invention to provide a visual safety means for use in a vehicular tire to indicate the amount of usable tread on the tire.

It is also an object of this invention to provide a visual safety means for use in a vehicular tire to warn when further use of the tire is unsafe.

Another object of this invention is to provide a visual safety means for use in a vehicular tire to indicate the amount of usable tread on the tire, and to warn when further use of the tire is unsafe.

Another object of this invention is to provide a visual safety means for use in a vehicle tire, which safety means is positioned on the outer side wall of the tire to indicate the amount of usable tread on the tire and to warn when further use of the tire is unsafe.

Other objects and advantages of my present invention will become apparent from the following description and drawings of which:

FIG. 1 is a perspective view of a vehicle tire embodying the features of my present invention;

FIG. 2 is a perspective view of an enlarged fragmentary transverse section of the tire shown in FIG. 1;

FIG. 3 is another perspective view of an enlarged fragmentary transverse section similar to FIG. 2 showing a modified embodiment of my present invention; and FIG. 4 is another view, similar to FIG. 3, showing the appearance of the improved safety means thereof determinative of unsafe tread condition.

A typical vehicular pneumatic tire 10 including the preferred embodiment of the safety means 11 of my present invention is shown at FIG. 1, and a section of the tire 10 and safety means 11 are shown at FIG. 2. The tire 10 comprises generally a fluid filled supporting carcass 12 bearing a tread 13 on the outer portion thereof. Since the tire 10 is typical of the numerous and well known types of pneumatic tires, each of which includes a carcass and a tread, neither the tire 10, or any other tire included in this description, will be described more specifically.

As shown at FIG. 1 and FIG. 2, the tread 13 includes a ground engaging portion 20 which defines the outer peripheral surface of tread 13, and a pair of transversely spaced side walls 21 and 22 which extend generally radially outwardly from the carcass 12 and terminate at their respective peripheral boundaries 23 and 24 at the respective opposite edges of the ground engaging portion 20. The tread 13 is provided with a plurality of like circumferential grooves 25 which are arranged at spaced transverse positions across the ground engaging portion 20, and each groove 25 terminates inwardly at a root portion 26. The root line R—R is defined by a line joining the plurality of root portions 26, and is generally arranged to coincide with the contour of the ground engaging portion 20 corresponding to a fully worn condition of the tread 13, and at which further use of the tire is extremely dangerous. A tire worn to the contour of line R—R is known as a "bald" tire. As shown at FIG. 2, when the tire 10 is worn to a "bald" condition there will yet be some tread covering the outer peripheral portion 30 of the carcass 12. However, the amount of the remaining tread will vary depending upon the type, grade and manufacturer of each particular tire, and for purposes of description the condition of wear at which the tire 10 is "bald" will be designated as 0 percent of usable tread on the tire 10. The contour line C—C corresponds to the contour of the ground engaging portion 20 when 10 percent of the original tread remains unused. This is the "caution" line with respect to wear of the tread 13 and at which further use of the tire 10 is unsafe. Thus, when the ground engaging portion 20 of the tread has worn to the contour C—C, the tire should be replaced, for as hereinbefore described, 90 percent of tire failure occur during the last 10 percent of tread wear.

While heretofore, wear indicators have been incorporated in the central groove of the tread of a tire, such indicators rarely have been used, and are not readily seen except upon a careful "hands-and-knees" examination of the tire. I have found that the condition of the tire 10, with respect to wear of the tread 13, is accurately and conspicuously indicated by incorporating a pair of circumferential bands 35 and 36 at the side walls 21 and 22 respectively of tread 13. The term "tread" is used in several senses in the art. It is used broadly to describe the entire outer covering of a tire, from bead to bead, and in its most limited sense to describe merely the ground engaging portion of the tire. In this description of tires embodying my present invention, "tread" is used to describe the expendable portion of a tire which, through normal usage, is worn by engagement with the ground, and the portion of the tire immediately adjacent and inwardly thereof. Thus, the term "side wall of the tread" is used herein to describe only the outer portion of the total side wall of a tire and does not include the portion of the total side wall at which, for example, decorative coloration is applied. In this embodiment, bands 35 and 36 are formed of a bright red rubber-like material ¼ inch in width and similar to the black material of which tread 13 is formed. However, it will be understood that bands 35 and 36 may be made narrower or wider as desired. Bands 35 and 36 may be attached to the side walls 21 and 22 by any suitable means, and in this embodiment the side walls 21 and 22 are underscored to receive the bands in a flush arrangement and the bands 35 and 36 are vulcanized thereto. The outside diameter of the outer circumferential edges 37 and 38 of bands 35 and 36 respectively are arranged to lie on the contour line C—C. Further visually distinguishable circumferential bands 39 and 40 are similarly attached to side walls 21 and 22, and extend radially outwardly therealong from edges 37 and 38 of bands 35 and 36 to the ground engaging portion 20. Bands 39 and 40 are formed of a yellow rubber-like material which is also similar to the material of which tread 13 is formed and are adapted to wear conformably therewith. Thus, the bands 35 and 39 and 36 and 40 define consecutive annular rings of red and yellow at the outer peripheral edge of side walls 21 and 22 respectively, and in contrast to the black material of tread 13. As tread 13 wears, the ground engaging portion 20 successively approaches the contour line C—C, and the yellow bands 39 and 40 are correspondingly worn so that the outer circumferential boundaries thereof successively approach edges 37 and 38 of the red bands 35 and 36 respectively. When the radial extent of yellow bands 39 and 40 provides a visual determination of the amount of usable tread on tire 10, tread 13 is worn to the condition at which the ground engaging portion 20 is coincident with contour line C—C, each of the yellow bands 39 and 40 is extinguished and only the red bands 35 and 36 remain. Since, as stated above, the contour line C—C represents the condition at which further use of the tire 10 is unsafe, the sole presence of red bands 35 and 36 provides a conspicuous warning that the tire 10 should be replaced. It will also be appreciated that when the tire 10 is used in this latter condition, the safety warning is visible not only to the vehicle operator, but to the public as well. In this way the tire itself provides conspicuous notice of the hazardous condition of the vehicle to which it is attached, and the notoriety thus produced will provide an added inducement to the operator to replace the tire. The bands 35 and 36 and 39 and 40 may be given any color which provides a visual distinction from the color of the tread 13, and rather than being formed in a continuous circumferential manner, may be interrupted to define a dashed configuration as well. In this way, the indication of usable tread, i.e. the presence of various widths of the yellow bands 39 and 40, and the warning that the tire is unsafe for further use and should be replaced, i.e. the sole presence of red bands 35 and 36 may be made suitably conspicuous and readily visible in the environment in which the tire is to be used.

Another embodiment of my present invention is illustrated at FIG. 3 and FIG. 4. The safety means 40 of this embodiment of my invention is used with a tire which, like the tire 10 includes a carcass 41 and a tread 42. The tread 42 includes a ground engaging portion 43 and a pair of transversely spaced side walls 44 and 45. A plurality of like circumferentially extending grooves 46 are arranged at spaced transverse positions across the ground engaging portion 43, and each of the grooves 46 terminate inwardly at a root portion 47. Like tire 10, the root line R'—R' is defined by a line passing through the plurality of root portions 47 and which conforms with the contour of the ground engaging portion 43 corresponding to a fully worn condition of the tire. The contour line C'—C' corresponds to the contour of the ground engaging portion 43 when 10 percent of the original tread remains unused, and as hereinbefore stated in the description of tire 10, is a "caution" line beyond which further use of the tire is unsafe.

The safety means 40 of this embodiment of my invention comprises circumferential bands 50 and 51 having a triangular transverse cross section. The outer side walls 52 and 53 of the bands 50 and 51 respectively are parallel with the respective side walls 44 and 45 of tread 42, and the outer peripheral surfaces 54 and 55 are arranged to conform with the contour of line C'—C'. Bands 50 and 51 are formed of a rubber-like material similar to that of which the tread 42 is formed, and are colored to provide a visual contrast with the side walls 44 and 45 thereof, and in this embodiment are bright red. The outer peripheral surfaces 54 and 55 and the walls 52 and 53 of bands 50 and 51 respectively are approximately ¼ of an inch in width, and as shown at FIG. 3, the side walls 44 and 45 of the tread 42 are comformably grooved to receive the bands. As the tire 10, the amount of the side wall 44 and 45 outwardly of the bands 50 and 51 provides an indication of the usable tread on the tire. Although, in this embodiment, the portion of the side walls outwardly of the bands 50 and 51 are not given a contrasting color, it will be understood that they may be colored to accentuate the measure of usable tread.

When tread 42 is reduced to the condition at which the ground engaging portion 43 is coincident with the contour of line C'—C', all of the side wall portions 44 and 45 outwardly of the bands 51 and 52 are extinguished and the outer peripheral surfaces 54 and 55 of the bands 51 and 52 are exposed. Thus, as shown at FIG. 4, when the tire is viewed from normal angles of observation both the outer peripheral wall and the side wall of the respective band at the side of the tire from which the view is taken are joined to produce a band which appears approximately twice as wide as the band of which theretofore only the side wall was exposed to view. This apparent enlargement of the band width provides a conspicuous notice of the hazardous condition of the vehicle to which it is attached. The notoriety thus produced will provide an added inducement to the operator of the vehicle to replace the tire. Like the bands of tire 10, it will be understood that the bands 50 and 51 may be given any desired color to provide a visual distinction with the side wall of the tread to which the bands are attached. Further, the dimension of side walls 52 and 53 and of outer peripheral surfaces 54 and 55 may be increased or decreased to provide a desired degree of conspicuousness.

In the embodiments described hereinbefore, the tires were provided with band means at each of the opposite side walls of the tread. The use of band means at each side wall also provides an indicator from which the condition of the tire with respect to even wearing may be determined, and assures that one band means of each tire will be exposed on the vehicle regardless of the manner of installation thereon. However, I have found that a band means at the exposed side wall of the tread of a tire will provide an accurate indication of the tire with respect to wear. Thus, in tires which are so arranged that only one predetermined side wall of the tire faces outwardly when installed on a vehicle, the safety means of my present invention may comprise a band means at the said one predetermined side wall.

While I have described several embodiments of my present invention it will be understood that modifications may be made therein without departing from the scope thereof and which are the equivalent thereof.

I claim:

1. In a pneumatic tire comprising a carcass bearing a rubber-like tread on the outer portion thereof, and in which the tread includes a pair of laterally spaced side walls and a ground engaging portion which extends therebetween and interjoins the respective peripheral boundaries thereof, the tread having the characteristic that it is successively diminished by wear at the ground engaging portion thereof and that the said wear produces a corresponding decrease in the respective peripheral boundaries of the side walls from a first circumference when the tire is new to a second and dimenished circumference when the tread is fully worn; a indicator means for visually determining the amount of usable tread on the tire and to provide a conspicuous warning when the tread is worn to a condition at which further use of the tire is unsafe, said indicator means comprising a circumferential band concentrically arranged at a side wall of the tread, the periphery of said band conforming to the second circumference of the peripheral boundary of said side wall, and said band being visually distinguishable from the tread.

2. The invention of claim 1 in which said safety means further comprises a second circumferential band, said second band being contiguous at the inner boundary thereof with the periphery of the said band and extending radially outwardly therefrom and along said side wall to the first circumference thereof, said second band being visually distinguishable from the said band and the tread.

3. The invention of claim 1 in which said circumferential band includes a laterally extending portion, and the side wall of the tread is provided with a circumferentially arranged groove conforming to said laterally extending portion and in which said portion is disposed, said laterally extending portion defining a peripheral surface which is arranged to coincide with the surface defined by said ground engaging portion adjacent said side wall when said tread is fully worn, whereby when said tread is fully worn said peripheral surface is exposed, thereby significantly increasing the visual extent and conspicuousness of said band.

4. A pneumatic tire comprising a carcass, a rubber-like tread attached to said carcass and forming the outer circumferential portion of said tire, said tread having a pair of laterally spaced side walls and a ground engaging portion extending therebetween and interjoining the respective peripheral boundaries thereof, said tread having the characteristic that it is successfully diminished by wear at said ground engaging portion and that said wear produces a corresponding diminution of said respective peripheral boundaries of said side walls from a first circumference when said tread is new to a second circumference when said tread is fully worn, and a indicator means for visually determining the amount of usable tread on the tire and to provide a conspicuous warning when the tread is worn to a condition at which further use of the tire is unsafe, said indicator means comprising a circumferential band at a side wall of said tread and positioned concentrically therewith, said band being visually distinguishable from said tread and having an outer boundary conforming to the second circumference of said side wall.

5. The invention of claim 4 in which said circumferential band includes a laterally extending portion, and said side wall is provided with a circumferential groove conforming to said laterally extending portion and in which said portion is disposed, said laterally extending portion defining a peripheral surface which is arranged to coincide with the surface defined by said ground engaging portion adjacent said side wall when said tread is fully worn, whereby when said tread is fully worn said peripheral surface is exposed, thereby significantly increasing the visual extent and conspicuousness of said band.

References Cited

UNITED STATES PATENTS

| 1,070,183 | 8/1913 | Rucker | 152—330 |
| 1,544,262 | 6/1925 | Midgley | 152—330 |
| 1,940,077 | 12/1933 | Coe | 152—330 |
| 2,102,784 | 12/1937 | Bridges | 116—114 |
| 2,706,509 | 4/1955 | White | 152—330 |

FOREIGN PATENTS

| 149,853 | 8/1920 | Great Britain. |
| 448,223 | 6/1936 | Great Britain. |

LOUIS J. CAPOZI, *Primary Examiner.*